(12) United States Patent
Yadav

(10) Patent No.: US 11,301,730 B2
(45) Date of Patent: Apr. 12, 2022

(54) APPARATUS AND METHOD FOR DETECTING AND REMOVING OUTLIERS USING SENSITIVITY SCORE

(71) Applicant: Wipro Limited, Bangalore (IN)

(72) Inventor: Rameshwar Pratap Yadav, Janakpuri (IN)

(73) Assignee: Wipro Limited, Bangalore (IN)

( * ) Notice: Subject to any disclaimer, the term of this patent is extended or adjusted under 35 U.S.C. 154(b) by 773 days.

(21) Appl. No.: 16/196,890

(22) Filed: Nov. 20, 2018

(65) Prior Publication Data

US 2020/0104648 A1 Apr. 2, 2020

(30) Foreign Application Priority Data

Sep. 28, 2018 (IN) .............................. 201841036828

(51) Int. Cl.
*G06K 9/62* (2006.01)
*G06F 17/18* (2006.01)

(52) U.S. Cl.
CPC ........... *G06K 9/6284* (2013.01); *G06F 17/18* (2013.01); *G06K 9/6223* (2013.01)

(58) Field of Classification Search
CPC ..... G06K 9/6284; G06K 9/6223; G06F 17/18
USPC ....................................................... 702/179
See application file for complete search history.

(56) References Cited

U.S. PATENT DOCUMENTS 8,050,979 B2 11/2011 Ruvini et al.
9,836,183 B1 * 12/2017 Love ................... G06F 16/9024
2010/0161609 A1 6/2010 Fogel

FOREIGN PATENT DOCUMENTS

CN 102360378 A 2/2012
CN 102509001 A 6/2012
CN 104462802 A 3/2015

* cited by examiner

*Primary Examiner* — John H Le
(74) *Attorney, Agent, or Firm* — Finnegan, Henderson, Farabow, Garrett & Dunner, LLP

(57) ABSTRACT

A method for detecting outliers is provided, the method comprising: receiving a digitized text corpus comprising a plurality of data points; identifying k clusters of the plurality of data points; sampling a data point among the plurality of data points as a first cluster center of the k clusters; determining sampling probability of each of remaining data points of the plurality of data points; sampling the next cluster center based on the sampling probability and iterate the process of determining sampling probability and the process of sampling the next cluster center until k cluster centers are sampled; generating weightage for each of the k cluster centers; determining sensitivity scores of the data points belonging to each of the k cluster centers; and labeling a data point having a sensitivity score greater than a threshold value as an outlier and removing the outlier from the digitized text corpus.

21 Claims, 5 Drawing Sheets

APPARATUS AND METHOD FOR DETECTING AND REMOVING OUTLIERS USING SENSITIVITY SCORE

This application claims the benefit of Indian Patent Application Serial No. 201841036828, filed Sep. 28, 2018, which is hereby incorporated by reference in its entirety.

FIELD

Apparatuses, methods and systems consistent with the present disclosure relate generally to detecting and removing outliers, and more particularly, to apparatuses, methods and systems that detect outliers from a text corpus using dynamically determined sensitivity score.

BACKGROUND

Technological advances have prompted applications that rely on the digitization of large volumes of datasets. For example, as processing power has increased, "big data" applications that perform computations using large amounts of data have become feasible and, as a result, mainstream. However, while calculations on large datasets can produce valuable insights, their results are only as valid as the data provided as input. And, in many cases, when this data originates from analog sources such as print media, it suffers from poor or errant digitization.

Outliers and anomalies (hereinafter collectively called as "outliers") appear in various steps of processing a dataset (e.g., a text corpus), which can significantly reduce the accuracy of computerized processing. For example, outlier entries in a dataset may skew average results or prevent the identification of an otherwise prevalent trend. Therefore, outliers in a dataset may result in less-usable computational results.

SUMMARY

According to some embodiments of the present disclosure, there is provided an apparatus for detecting outliers of a digitized text corpus. The apparatus may comprise a memory for storing instructions; and a processor that, when executing the instructions performs a method, the method comprising: receiving the digitized text corpus comprising a plurality of data points ($X=\{x_i\}_{i=1}^n$); identifying k clusters of the plurality of data points, wherein k is a natural number smaller than n; sampling a data point among the plurality of data points as a first cluster center of the k clusters; determining sampling probability of each of remaining data points of the plurality of data points, wherein the remaining data points indicate a difference between the plurality of data points and the sampled data point and the sampling probability indicates a probability of each of the remaining data points to be sampled as a next cluster center of the k clusters; sampling the next cluster center based on the sampling probability and iterate the process of determining sampling probability and the process of sampling the next cluster center until k cluster centers are sampled to form a set of cluster centers $C=\{C\}_{i=1}^k$, wherein each of the k cluster centers corresponds to each of the k clusters; generating weightage for each of the k cluster centers by counting a number of data points belonging to each of the k cluster centers; determining sensitivity scores of the data points belonging to each of the k cluster centers based on the weightage for each of the k cluster centers; labeling, based on the determined sensitivity scores, a data point having a sensitivity score greater than a preset threshold score value as an outlier of the digitized text corpus and removing the outlier from the digitized text corpus; and providing a first parameter of the digitized text corpus by analyzing the removed outlier or a second parameter of the digitized text corpus by analyzing data points without the outlier.

In the apparatus, the k clusters of the plurality of data points may be identified by spherical k-means clustering technique applied to the plurality of data points.

In the apparatus, the first cluster center may be selected among data points belonging to a cluster having a highest density of data points among the k clusters.

In the apparatus, the sampling probability may be determined by calculating angular distance between the sampled data point and each of the remaining data points and normalizing the calculated angular distance with a sum of all distances between the sampled data point and the remaining data points.

In the apparatus, a sensitivity of a data point may be determined based on determination of a maximal ratio between a cost contribution of the data point and an average cost contribution of the plurality of data points.

In the apparatus, the preset threshold score value may be determined based on a number of outliers that a user decided to detect and remove from the digitized text corpus.

In the apparatus, the number of data points belonging to each of the k cluster centers may be determined by assigning each of the plurality of data points to a nearest cluster center among the k cluster centers and determining distance between each of the plurality of data points and the corresponding nearest cluster center.

According to some embodiments of the present disclosure, there is provided a method for detecting outliers of a digitized text corpus. The method comprising: receiving the digitized text corpus comprising a plurality of data points ($X=\{x_i\}_{i=1}^n$); identifying k clusters of the plurality of data points, wherein k is a natural number smaller than n; sampling a data point among the plurality of data points as a first cluster center of the k clusters; determining sampling probability of each of remaining data points of the plurality of data points, wherein the remaining data points indicate a difference between the plurality of data points and the sampled data point and the sampling probability indicates a probability of each of the remaining data points to be sampled as a next cluster center of the k clusters; sampling the next cluster center based on the sampling probability and iterate the process of determining sampling probability and the process of sampling the next cluster center until k cluster centers are sampled to form a set of cluster centers $C=\{C\}_{i=1}^k$, wherein each of the k cluster centers corresponds to each of the k clusters; generating weightage for each of the k cluster centers by counting a number of data points belonging to each of the k cluster centers; determining sensitivity scores of the data points belonging to each of the k cluster centers based on the weightage for each of the k cluster centers; labeling, based on the determined sensitivity scores, a data point having a sensitivity score greater than a preset threshold score value as an outlier of the digitized text corpus and removing the outlier from the digitized text corpus; and providing a first parameter of the digitized text corpus by analyzing the removed outlier or a second parameter of the digitized text corpus by analyzing data points without the outlier.

In the method, identifying the k clusters of the plurality of data points may further comprise: applying, by the processor, spherical k-means clustering algorithm to the plurality of data points.

In the method, determining the sampling probability of each of remaining data points of the plurality of data points may further comprise: calculating, by the processor, angular distance between the sampled data point and each of the remaining data points; and normalizing, by the processor, the calculated angular distance with a sum of all distances between the sampled data point and the remaining data points.

In the method, generating the weightage of each of the k cluster centers may further comprise: assigning, by the processor, each of the plurality of data points to a nearest cluster center among the k cluster centers; and determining, by the processor, distance between each of the plurality of data points and the corresponding nearest cluster center.

According to some embodiments of the present disclosure, there is provided a non-transitory computer readable medium including instructions stored thereon that when processed by a processor cause a system for detecting outliers of a digitized text corpus to perform acts of: receiving the digitized text corpus comprising a plurality of data points ($X=\{x_i\}_{i=1}^{n}$); identifying k clusters of the plurality of data points, wherein k is a natural number smaller than n; sampling a data point among the plurality of data points as a first cluster center of the k clusters; determining sampling probability of each of remaining data points of the plurality of data points, wherein the remaining data points indicate a difference between the plurality of data points and the sampled data point and the sampling probability indicates a probability of each of the remaining data points to be sampled as a next cluster center of the k clusters; sampling the next cluster center based on the sampling probability and iterate the process of determining sampling probability and the process of sampling the next cluster center until k cluster centers are sampled to form a set of cluster centers $C=\{C\}_{i=1}^{k}$, wherein each of the k cluster centers corresponds to each of the k clusters; generating weightage for each of the k cluster centers by counting a number of data points belonging to each of the k cluster centers; determining sensitivity scores of the data points belonging to each of the k cluster centers based on the weightage for each of the k cluster centers; labeling, based on the determined sensitivity scores, a data point having a sensitivity score greater than a preset threshold score value as an outlier of the digitized text corpus and removing the outlier from the digitized text corpus; and providing a first parameter of the digitized text corpus by analyzing the removed outlier or a second parameter of the digitized text corpus by analyzing data points without the outlier.

The subject matter below is taught by way of various specific exemplary embodiments explained in detail, and illustrated in the enclosed drawing figures.

DETAILED DESCRIPTION

Figure 1:
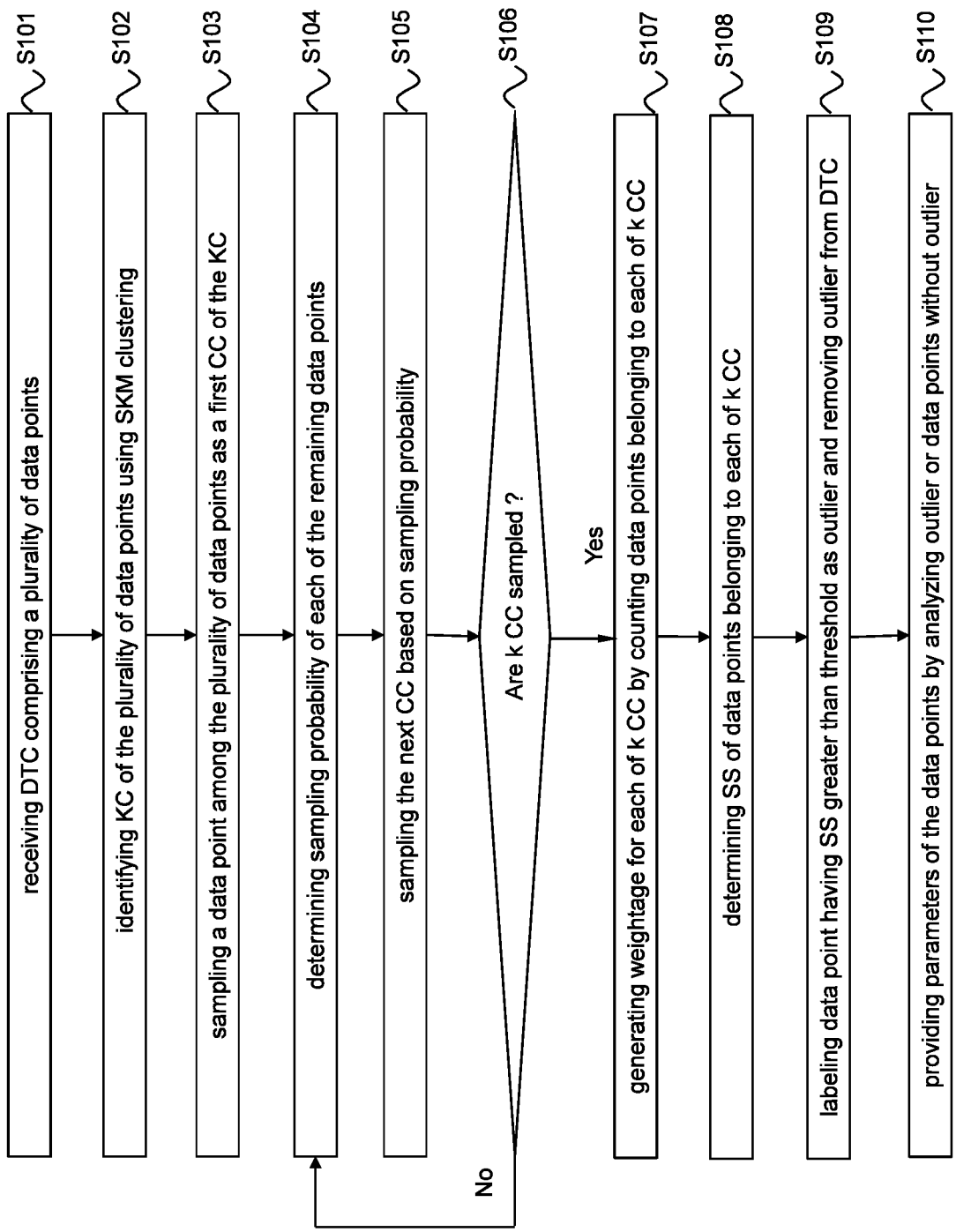
FIG. 1 is a flowchart indicating an exemplary method for detecting and removing outliers from a text corpus based on sensitivity score, consistent with some exemplary embodiments of the present disclosure.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations. Instead, they are merely examples of apparatuses and methods consistent with aspects discussed in this disclosure.

Automatic detection and removal of outliers in a dataset may be valuable in numerous fields, for example, document screening, spam filtering, automatic processing of emails, news articles, cataloguing Web pages, etc. Detection of outliers in a dataset, however, is a challenging task, especially for a large volume, high-dimensional dataset such as digitized text corpus. The present disclosure provides methods, apparatuses and systems for detecting and removal of outliers that is especially suitable for a digitized text corpus.

Outliers can be isolated data points that do not fit well to the general data distribution, and the outlierness of a given data point within a set may represent a degree of deviation of that data point from the general data distribution. Outlierness may provide a quantitative measurement of how far a given data point strays from the rest of the data in a set.

Disclosed embodiments may relate to a clustering step for identifying latent factors, automatic topic extraction, filtering, and fast information retrieval. Techniques used for the clustering can be adversely affected by outliers, which may dramatically change the outcome of the clustering. Therefore, disclose embodiments may improve on prior systems by accurately and efficiently detecting and removing the outliers from a dataset to obtain an accurate and consistent clustering results.

Efficient outlier detection may improve accuracy of the dataset, as well as reduce runtime of the clustering because the clustering process would converge with the removal of the outliers. For example, for a given set of N data points that includes at most $\alpha$ fraction of the outliers, where $0<\alpha<1$, a brute force approach is to iterate over all $C\alpha n$ (n) possibilities, systems may compute the clustering score in each of the possible scenarios and then select the best one. However, without the disclosed embodiments, such clustering technique may be infeasible and impracticable when the value of $\alpha$ is large. Even for small values of $\alpha$, such clustering technique may be impracticable in prior systems when size of the dataset is large. Thus, disclosed embodiments may provide an efficient outlier detection and removal technique that improves accuracy of data processing and also allows clustering process converges quickly, and thereby reducing runtime of the clustering and leading to a faster data processing.

While this disclosure relates to clustering in many contexts, certain embodiments may employ spherical clustering, such as spherical k-means clustering. Unlike classic k-means clustering, which seeks to minimize the Euclidean distance between a cluster center and members of the cluster, spherical k-means clustering may center each cluster such that the angles between the clusters are both uniform and minimal. That is, the clusters of spherical k-means clustering may be determined using cosine similarity, as opposed to merely Euclidean distance from a centroid (as is used in classic k-means clustering). While certain embodiments may benefit from spherical k-means clustering (e.g., for text corpus processing), other forms of clustering may be used by disclosed embodiments consistent with this disclosure.

References are now made to FIG. 1 showing a flowchart indicating an exemplary method for detecting and removing outliers from a text corpus based on sensitivity score, consistent with some exemplary embodiments of the present disclosure. In FIG. 1, in step S101, a digitized text corpus X (DTC in the FIG. comprising a plurality of data points xi with $X=\{x_i\}_{i=1}^n$ is received, where n is a natural number. The text corpus may be pre-stored in a storage medium or a data stream.

In step S102, the plurality of data points of the text corpus is partitioned into a given number k of groups such that k representative clusters (KC in the figure) are identified, where k is a natural number smaller than n. In some embodiments, the k clusters of the plurality of data points xi are identified using spherical k-means (SKM in the figure) clustering technique applied to the plurality of data points, where a distance between two data points may be defined as the Euclidean distance after projecting a set of vectors representing the text corpus onto a unit sphere. For example, let $X=\{x_1, x_2, \ldots, x_n\}$ denote the set of n vectors on the unit sphere in Rd, that is, $\|xi\|=1$ for $1 \leq i \leq n$. Let $\{\pi_1, \pi_2, \ldots, \pi_k\}$ denote a partition of the set of vectors into k disjoint clusters such that $$\bigcup_{i=1}^k \pi_i = X \text{ and } \pi_i \cap \pi_j = \phi \text{ for } i \neq j.$$

For each $1 \leq i \leq k$, the Fisher-mean of the vectors belong to the cluster $\pi_i$ is $$Ci = \frac{\sum_{x \in \pi_i} X}{\left|\sum_{x \in \pi_i} X\right|}.$$

The quality of any partition $\bigcup_{i=1}^k \{\pi_i\}$ is evaluated using the following objective function:

$$\Phi_C(X) = \sum_{i=1}^k \sum_{x \in \pi_i} d(x_i, c_i) = \frac{3|X|}{2} - \sum_{i=1}^k \sum_{x \in \pi_i} \langle x_i c_i \rangle.$$

The way to find the spherical k-means is the problem of finding a partition of the set of vectors X so that the above objective function is minimized. Clearly, minimizing $\Phi_c(X)$ is equivalent to maximization of the term $$\sum_{i=1}^k \sum_{x \in \pi_i} \langle x_i c_i \rangle.$$

This problem has been shown to be NP-complete (NP stands for "nondeterministic polynomial time" or the problem is computationally difficult). Here, $C_i^*$ is denoted as the optimal cluster center of the ith cluster and $OPT=\{C_i^*\}_{i=1}^k$ as the set of k optimal cluster centers.

Spherical k-means uses angular distance (cosine similarity) in clustering. By using spherical k-means to cluster a text corpus, the above disclosed method may meet the unique challenge in detecting outliers in a digitized text corpus, that is, different words may be used to indicate the same semantic meaning (the sparsity problem). By using angular distance (cosine similarity) to cluster texts, the proposed method may be better to capture the semantic meaning of the texts without considering the length of the texts.

In step S103, a data point among the plurality of data points is sampled as a first cluster center C1 of the k clusters. The first cluster center C1 (CC in the figure) may be randomly from the plurality of data points. In some embodiments, the first cluster center C1 is selected among data points belonging to a cluster having a highest density of data points among the k clusters (heaviest cluster). The remaining k−1 data points are sampled based on probability distributions as discussed below.

In step S104, sampling probability of each of the remaining data points of the plurality of data points is determined. The remaining data points indicate a difference between the plurality of data points and the sampled data point. The sampling probability indicates a probability of each of the remaining data points to be sampled as a next cluster center of the k clusters. In some embodiments, an angular distance is calculated between the first sampled point (the first cluster center) and each of the remaining data points, and the calculated angular distance is normalized with sum of all distances between the first sampled data point C1 and the remaining data points. This provides the probability distribution, that is, a probability score of getting sampled for each of the remaining data points. Further, the second point C2 is sampled based on the probability score.

In step S105, sampling the next cluster center based on the sampling probability determined in step S104. For a set of sampled data points {C1, C2 . . . Ci}, in step S104, a probability distribution is generated in order to sample the (i+1)th data point. In particular, angular distances between every remaining data point and the set of already sampled data points {C1, C2 . . . Ci} is calculated and these distances are normalized with the sum of distances between the remaining data points and already sampled data points {C1, C2 . . . Ci}. This provides the sampling probability for each of the data points, that is, a higher probability score of a data point indicates that the data point has higher probability of getting sampled. Further, the (i+1)th data point is sampled (Ci+1) based on the sampling probability distribution.

In step S106, it is determined whether k cluster centers are sampled or not. In response to a determination that k cluster centers are not sampled, the step of determining sampling probability (S104) and the step of sampling the next cluster center (S105) are iterated until k cluster centers are sampled to form a set of cluster centers $C=\{C\}_{i=1}^k$, wherein each of the k cluster centers corresponds to each of the k clusters. On the other hand, in response to a determination that k cluster centers are sampled, the process of step S107 is operated.

In step S107, weightage for each of the k cluster centers are generated by counting a number of data points belonging to each of the k cluster centers. The number of data points belonging to each of the k cluster centers is determined by assigning each of the plurality of data points to a nearest cluster center among the k cluster centers and determining distance between each of the plurality of data points and the corresponding nearest cluster center.

In step S108, sensitivity scores (SS in the figure) of the data points belonging to each of the k cluster centers are determined based on the weightage for each of the k cluster centers. Here, sensitivity score, the worst-case impact of a data point over all k clusters, is used as a measure of outlierness. In particular, influence, which may be an upper bound on the sensitivity, is used as a direct measure of outlierness. For a set of data points $X=\{x_i\}_{i=1}^n$ and a set of cluster centers $C=\{C_i\}_{i=1}^k$, the sensitivity of a data point may be defined as the maximal ratio between its contribution and the average contribution i.e., $$\rho(x) = \sup_{\mathcal{C} \in \mathbb{C}} \frac{d(x, C)}{\frac{1}{|X|}\Phi_C(X)},$$

where $\mathbb{C}$ is the set of all possible clustering solution on X, and $\mathcal{C} \in \mathbb{C}$ is a possible clustering solution with C=k. In general, $\rho(x)$ cannot be computed efficiently as it is with respect to all possible set of k points in Rd. Further, upper bound the sensitivity $\rho(x)$ in terms of a proxy function influence $s(x)$ uniformly over all $x \in \chi$ such that the bound is as tight as possible. Thus, obtaining a good approximation for $\rho(x)$ is equivalent to minimizing $$S = \frac{1}{|X|} \sum_{x \in X} s(x),$$

over all upper bound $s(x)$. An expression of influence is computed and as a consequence an upper bound for the sensitivity.

In step S109, based on the dynamically calculated sensitivity scores, a data point having a sensitivity score greater than a preset threshold score value is labeled as an outlier of the digitized text corpus and the outlier is removed from the text corpus. By this way, a number of outliers are dynamically detected and removed on the fly from the text corpus based on dynamically calculated sensitivity scores, thereby ensuring accuracy of the text corpus. In some embodiments, along with text corpus, a user can indicate a number of outliers that need to be detected and removed from the text corpus. Unlike conventional methods, the method of the present disclosure is used to determine which points in the text corpus are outliers. For example, if there are n points in the dataset and there are $\alpha \cdot n$ points are outliers. Conventional mechanisms go over all $C\alpha n$ (n) options, which is huge and time consuming. The method of the present disclosure is pruning the search space and bring down $C\alpha n$ (n) to $O(n)$, and thereby increases efficiency of data processing.

As an example, the method may be applied to a synthetic dataset to detect and remove the outliers from the dataset. The dataset includes ten points and is expressed as $D=\{x_i\}_{i=1}^{10}$ in two dimensions. The coordinates of the data points as shown below:

$x_1$=(0.996, 0.087), $x_2$=(0.995, 0.095), $x_3$=(0.994, 0.104), $x_4$=(0.997, 0.069), $x_5$=(0.996, 0.078), $x_6$=(0.50, 0.866), $x_7$=(0.484, 0.874), $x_8$=(0.469, 0.084), $x_9$=(0.766, 0.642), $x_{10}$=(0.754, 0.656)

In a first step, the ten data points are partitioned into two clusters, i.e., a first cluster $\{x_i\}_{i=1}^5$ and a second cluster $\{x_i\}_{i=6}^8$. Data points $x_9$ and $x_{10}$ do not belong to any of the clusters since they deviate from the data points of the first cluster and the data points from the second cluster. After that, the first cluster center is sampled from the heaviest cluster among the two clusters, i.e., the first cluster, and a data point in the first cluster is selected as a first cluster center. In this case, data point $x_3$ of the first cluster is selected as the first cluster center, that is, $C1=x_3$. Further, angular distance between each of the remaining data points and the sampled first cluster center $C1=x_3$ is calculated, and the calculation results as follows:

$d(x_1, C1)$=0.5, $d(x_2, C1)$=0.501, $d(x_4, C1)$=0.501, $d(x_5, C1)$=0.501

$d(x_6, C1)$=0.912, $d(x_7, C1)$=0.928, $d(x_8, C1)$=0.941, $d(x_9, C1)$=0.671, $d(x_{10}, C1)$=0.682

Further, the corresponding sampling probability of the remaining data points are calculated by normalizing each of the angular distances with sum of all distances between the first sampled data point C1 and the remaining data points. The calculated sampling probability distribution is shown below:

$Pr(x_1)$=0.081, $Pr(x_2)$=0.081, $Pr(x_4)$=0.081, $Pr(x_5)$=0.081, $Pr(x_6)$=0.148, $Pr(x_7)$=0.151, $Pr(x_8)$=0.153, $Pr(x_9)$=0.109, $Pr(x_{10})$=0.111

Further, a second cluster center is sampled by selecting a data point having highest sampling probability. As a result, data point $x_8$ is sampled as the second cluster center. Here, "B" is designated as the set of cluster centers, i.e., B={C1, C2}={$x_3$, $x_8$}. The value of the parameter a=8 (log k+2) =21.545, as k=2. After assigning all the points to either the first cluster center C1 or the second cluster center C2, the following two clusters are obtained:

P1={$x_1$, $x_2$, $x_4$, $x_5$}, P2={$x_6$, $x_7$, $x_9$, $x_{10}$}.

Further, a distance from each of the data points to its closest cluster center is calculated and the results are as follows:

$d(x_1,B)$=0.5, $d(x_2,B)$=0.501, $d(x_4,B)$=0.501, $d(x_5,B)$=0.501

$d(x_6,B)$=0.482, $d(x_7,B)$=0.500, $d(x_9,B)$=0.573, $d(x_{10},B)$=0.566

The value of the parameter $C\emptyset$=0.4606. Then sensitivity scores of all the data points are calculated and the results are as follows:

$S(x_1)$=80.130, $S(x_2)$=80.177, $S(x_4)$=80.177, $S(x_5)$=80.177, $S(x_6)$=82.135, $S(x_7)$=82.976, $S(x_9)$=86.390, $S(x_{10})$=86.063.

There are two data points, i.e., $x_9 \wedge x_{10}$ having the highest sensitivity scores. As a result, $x_9 \wedge x_{10}$ are labelled as outliers and are removed from the dataset. In the above example, the user can decide a number of outliers that need to be removed from the dataset.

In step S110, the removed outliers are analyzed to provide new insights of the text corpus. For example, outliers of a credit card transaction data may indicate abuse of the credit card, and outliers of a patient medical record may indicate a medical error (treatment error or prescription error) or development of a new disease. In addition, the data points without outliers may be further analyzed to provide a general trend or statistical parameters of the text corpus.

Figure 2:
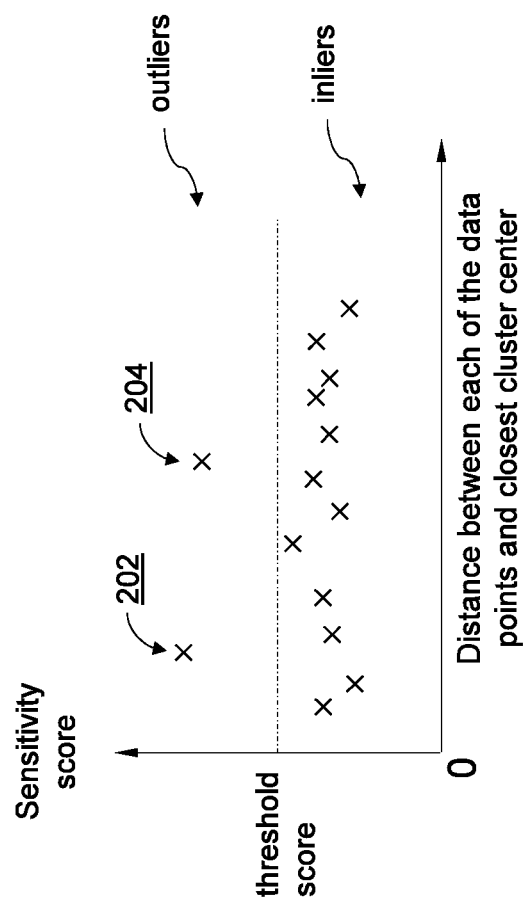
FIG. 2 is a schematic diagram illustrating comparison of sensitivity scores of data points of a cluster in a text corpus and determining outliers based on the comparison, consistent with some embodiments of the present disclosure.

References are now made to FIG. 2, a schematic diagram illustrating an exemplary comparison of sensitivity scores of data points of a cluster in a dataset and determining outliers based on the comparison, consistent with some embodiments of the present disclosure. In FIG. 2, the vertical axes indicate sensitivity scores of multiple data points of the dataset (in this example 14 data points), and the horizontal axes indicate a distance between each of the data points and its closest cluster center. In FIG. 2, the sensitivity scores of most of the data points (in this example, 12 data points) are lower than a preset threshold score value (as shown as the horizontal dashed line) while the sensitivity scores of the remaining two data points (shown as 202 and 204) are higher than the preset threshold score value. As such, data points 202 and 204 are identified as outliers and removed from the dataset. The preset threshold score value may be determined by a user input, based on the number of outliers that the user wishes to remove from the dataset. For example, the user may increase the preset threshold score value if the user wishes to remove more outliers from the cluster and may decrease the preset threshold score value if the user wishes to remove less outliers from the cluster. The preset threshold score value may also be determined and adjusted dynamically and automatically by a system based on a distribution of sensitivity scores of the data points. For example, when sensitivity scores of most of the data points have very narrow distribution, the threshold score value may be set as a number at the outward boundary of the very narrow distribution. By this way, outliers of the cluster are identified based on dynamically computed sensitivity scores and dynamically set threshold score value, and thereby accuracy of the outlier detection is ensured.

Figure 3:
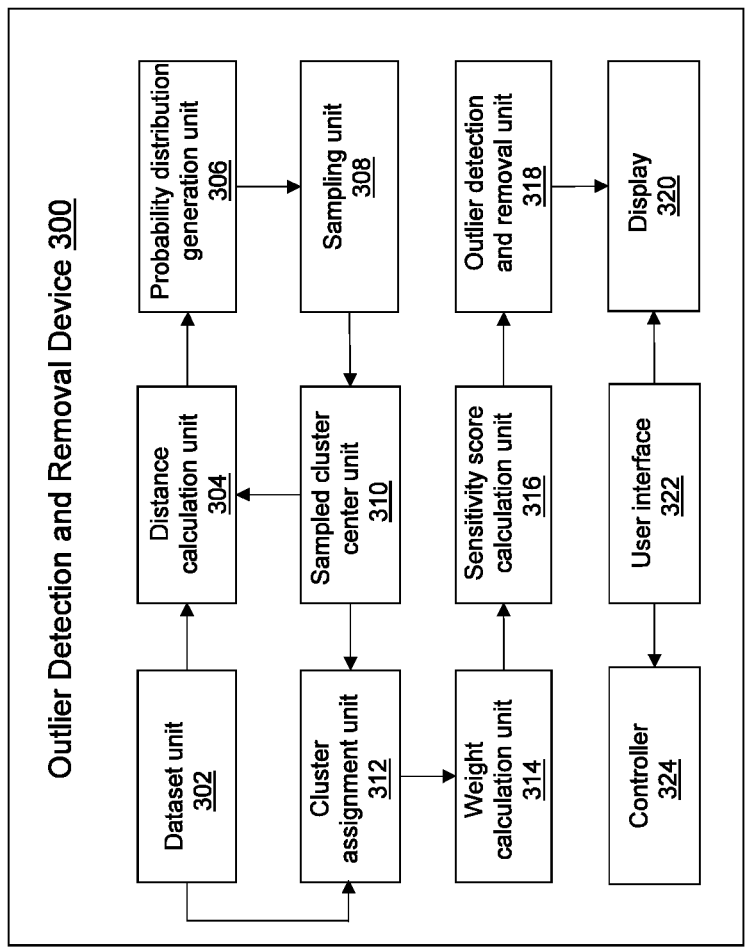
FIG. 3 is a schematic block diagram illustrating an exemplary apparatus for detecting and removing outliers from a text corpus based on sensitivity score, consistent with some embodiments of the present disclosure.

References are now made to FIG. 3, a schematic diagram illustrating an exemplary apparatus for detecting and removing outliers from a text corpus based on dynamically generated sensitivity score, consistent with some embodiments of the present disclosure. As shown in FIG. 3, an outlier detection and removal device 300 for detecting and removing outliers from a text corpus comprises a dataset unit 302, a distance calculation unit 304, a probability distribution generation unit 306, a cluster assignment unit 312, a sampled cluster center unit 310, a sampling unit 308, a weight calculation unit 314, a sensitivity score calculation unit 316, and an outlier detection and removal unit 318. In some embodiments, each unit comprises electronic circuitry and operates independently from other units. In some embodiments, each unit is a functional block of an integrated electronic circuitry.

Dataset unit 302 may be configured to extract information from a plurality of sources and save all the data points of a text corpus. Dataset unit 302 is further configured to provide a plurality of data points to distance calculation unit 304 with or without receiving a request from distance calculation unit 304. In some embodiments, dataset unit 302 may initiate the outlier detection and removal operation by providing the data points to distance calculation unit 304 responsive to a remote control signal transmitted through a wired or a wireless signal.

Distance calculation unit 304 may be configured to receive an input from dataset unit 302 and an input from sampled cluster center unit 310. The input from dataset unit 302 comprises the plurality of data points transferred from dataset unit 302, and the input from sampled cluster center unit 310 comprises one or more data points that are already sampled as cluster centers. Based on the received inputs, distance calculation unit 304 calculates a distance between each remaining data point among the plurality of data points and the one or more already sampled cluster centers.

In some embodiments of the present disclosure, as an initial operation, distance calculation unit 304 may partition the plurality of data points of the text corpus into k representative clusters by applying spherical k-means clustering technique to the plurality of data points of the text corpus. Unlike classic k-means clustering, which seeks to minimize the Euclidean distance between a cluster center and members of the cluster, spherical k-means clustering may center each cluster such that the angles between the clusters are both uniform and minimal. That is, the clusters of spherical k-means clustering may be determined using cosine similarity, as opposed to merely Euclidean distance from a centroid (as is used in classic k-means clustering). By using spherical k-means to cluster a text corpus, the outlier detection and removal device 300 may meet the unique challenge in detecting outliers in a digitized text corpus, that is, different words may be used to indicate the same semantic meaning (the sparsity problem). By using angular distance (cosine similarity) to cluster texts, the outlier detection and removal device 300 may be better to capture the semantic meaning of the texts without considering the length of the texts. While certain embodiments may benefit from spherical k-means clustering (e.g., for text corpus processing), other forms of clustering may be used by disclosed embodiments consistent with the present disclosure.

Distance calculation unit 304 may further select a data point among the plurality of data points as a first cluster center C1 of the k clusters. The first cluster center C1 may be selected in a cluster having a highest density of data points among the k clusters (heaviest cluster). Distance calculation unit 304 may further calculate an angular distance between the first cluster center C1 and each of the remaining data points and transmits the calculated distance to probability distribution generation unit 306.

Probability distribution generation unit 306 may be configured to receive an input from distance calculation unit 304 and generate a sampling probability distribution of all the data points i.e., for each and every data point in the text corpus a score is generated. The score ranges between 0 and 1, and the score indicates a probability of that data point being sampled. For example, the angular distance between the first sampled data point, the first cluster center C1 and each of the remaining data points is normalized with sum of all the distances between the first cluster center C1 and the remaining data points. This provides the sampling probability distribution, that is, a probability of getting sampled. The data point that has the highest probability score may be considered as the next cluster center.

Sampling unit 308 may be configured to receive the sampling probability distribution from probability distribution generation unit 306, sample a data point based on the sampling probability distribution. For example, sampling unit 308 samples a data point having highest sampling probability as the next cluster center. Sampling unit 308 further transmits the sampled data point to sampled cluster center unit 310. In some embodiments, rather than the data point itself, sampling unit 308 may transmit identifier of the data point to sampled cluster center unit 310.

Sampled cluster center unit 310 may be configured to collect all the sampled data points and determines whether k cluster centers are sampled or not. Responsive to determining that the sampled cluster centers are less than k, sampled cluster center unit 310 transmits the sampled clusters to distance calculation unit such that the loop of (distance calculation)→(sampling probability generation)→(sampling cluster centers)→(providing sampled cluster centers for distance calculation) keeps running until k cluster centers are sampled. On the other hand, responsive to determining that k cluster centers are sampled, sampled cluster center unit 310 transmits the sampled k cluster centers to cluster assignment unit 312.

Cluster assignment unit 312 may be configured to receive the sampled k cluster centers from sampled cluster center unit 310 and the plurality of data points from dataset unit 302. Once the k cluster centers transferred, cluster assignment unit 312 assigns all the plurality of data points to one of the k cluster centers to form clusters with the sampled k data points as the cluster centers. Cluster assignment unit 312 may assign each of the plurality of data points to a closest cluster center among the k cluster centers. In some embodiments, sampled cluster center unit 310 and cluster assignment unit 312 are implemented as a part of sampling unit 308. Cluster assignment unit 312 is further configured to transfer the formed k clusters to weight calculation unit 314.

Weight calculation unit 314 may be configured to receive an input from cluster assignment unit 312, count the number of data points belonging to each cluster of the k clusters, and assign the number as a weight of that cluster. Weight calculation unit 314 is further configured to transfer the weights of each cluster to the sensitivity score calculation unit 316.

Sensitivity score calculation unit 316 may be configured to receive an input from weight calculation unit 314 and calculate a sensitivity score for each of the data point based on the weight of each cluster. Here, sensitivity score, which may be the worst-case impact of a data point over all k clusters, may be used as a measure of outlierness. Sensitivity score of a data point of a plurality data points may be determined by computing the maximal ratio between contribution of that data point and the average contribution of the plurality of data points. In particular, influence, which may represent an upper bound of the sensitivity score, is used as a direct measure of outlierness.

Outlier detection and removal unit 318 may be configured to receive an input from sensitivity score calculation unit 316 and may identify a data point having highest sensitivity score as an outlier of the text corpus. In some embodiments, outlier detection and removal unit 318 may automatically label cm data points having high sensitivity scores as the outliers of the text corpus. In some embodiments, outlier detection and removal unit 318 labels a specific number of outliers that a user decided to remove from the text corpus, based on a user input. By this way, outlier detection and removal device 300 dynamically determines sensitivity scores of a text corpus, detects outliers based on the sensitivity scores, and removes the outliers from the text corpus, thereby ensures accuracy of the text corpus.

In some embodiments of the present disclosure, outlier detection and removal device 300 may further comprise a controller 324 configured to control outlier detection and removal process. Controller 324 may comprise an electronic circuitry or a processor that is configured to transmit control signals to each of the units of outlier detection and removal device 300. Controller 324 may be configured to receive a remote control signal through a wireless network and control the outlier detection and removal process based on a remote control signal. Controller 324 may be configured to analyze the removed outliers to provide new insights of the text corpus. For example, outliers of a credit card transaction data may indicate abuse of the credit card, and outliers of a patient medical record may indicate a medical error (treatment error or prescription error) or development of a new disease. In addition, controller 324 may be configured to analyze the data points without outliers to provide a general trend or statistical parameters of the text corpus.

In some embodiments of the present disclosure, outlier detection and removal device 300 may further comprise a display 320. Display 320 may be configured to display dynamically calculated sensitivity score distribution of the data points (e.g., FIG. 2) such that a user can dynamically monitor the data processing and decide the number of outliers to be removed from the text corpus. The display may be any type of a computer output surface and projecting mechanism that shows text and graphic images, including but not limited to, cathode ray tube (CRT), liquid crystal display (LCD), light-emitting diode (LED), gas plasma, a touch screen, or other image projection technologies, for displaying information to a computer user.

In some embodiments of the present disclosure, outlier detection and removal device 300 may further comprise a user interface 322. User interface 322 may be configured to transmit user command to controller 324, for example, a user-defined number of outliers to be removed. User interface 322 may be any type of a computer hardware equipment used to provide data and control signals from an operator to outlier detection and removal device 300. User interface 322 may include, but is not limited to, a touchscreen, a keyboard, a mouse, a scanner, a digital camera, a joystick, a trackball, cursor direction keys, or audio/video commanders, etc.

Figure 4:
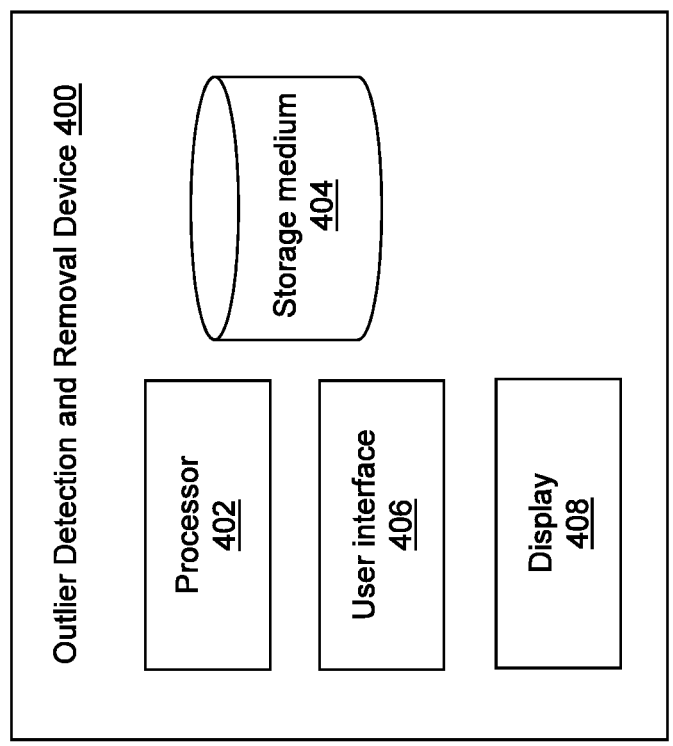
FIG. 4 is a schematic block diagram illustrating another exemplary apparatus for detecting and removing outliers from a text corpus based on sensitivity score, consistent with some embodiments of the present disclosure.

Reference is now made to FIG. 4, a block diagram illustrating another exemplary apparatus for detecting and removing outliers from a text corpus based on sensitivity score, consistent with some embodiments of the present disclosure. As shown in FIG. 4, an outlier detection and removal device 400 is a computer system comprising a processor 402, a storage medium 404, a user interface 406 and a display 408. The computer system may include, but is not limited to, a personal computer, a workstation, a network computer or any device having one or more processors. Processor 402 is configured to build a plurality of outlier detection and removal knowledge files based on outlier detection and removal history.

In some embodiments of the present disclosure, processor 402 may comprise the structural units as shown in FIG. 3, i.e., dataset unit 302, distance calculation unit 304, probability distribution generation unit 306, cluster assignment unit 312, sampled cluster center unit 310, sampling unit 308, weigh calculation unit 314, sensitivity score calculation unit 316, and outlier detection and removal unit 318. To avoid repetition, detailed descriptions about these units are omitted here. In some embodiments of the present disclosure, the structural units as shown in FIG. 3 may be functional blocks of outlier detection and removal instructions (or software) stored in storage medium 404, and processor 402 executes the instructions (or software) to perform the outlier detection and removal operations as described with regard to FIG. 3.

Display 408 may be configured to display sensitivity score distribution (e.g., FIG. 2) and outlier removal results in real time so that a user can efficiently monitor data processing process and control outlier detection and removal results. User interface 406 is configured to transmit user command to processor 402, for example, a user-defined number of outliers to be removed.

Storage medium 404 may be a non-transitory computer readable medium storing a set of instructions that is executable by processor 402 to cause outlier detection and removal device 400 to perform a method comprising: receiving a digitized text corpus comprising a plurality of data points $(X=\{x_i\}_{i=1}^{n})$; identifying k clusters of the plurality of data points, wherein k is a natural number smaller than n; sampling a data point among the plurality of data points as a first cluster center of the k clusters; determining sampling probability of each of remaining data points of the plurality of data points, wherein the remaining data points indicate a difference between the plurality of data points and the sampled data point and the sampling probability indicates a probability of each of the remaining data points to be sampled as a next cluster center of the k clusters; sampling the next cluster center based on the sampling probability and iterate the process of determining sampling probability and the process of sampling the next cluster center until k cluster centers are sampled to form a set of cluster centers $C=\{C\}_{i=1}^{k}$, wherein each of the k cluster centers corresponds to each of the k clusters; generating weightage for each of the k cluster centers by counting a number of data points belonging to each of the k cluster centers; determining sensitivity scores of the data points belonging to each of the k cluster centers based on the weightage for each of the k cluster centers; labeling, based on the determined sensitivity scores, a data point having a sensitivity score greater than a preset threshold score value as an outlier of the digitized text corpus and removing the outlier from the digitized text corpus; and providing a first parameter of the digitized text corpus by analyzing the removed outlier or a second parameter of the digitized text corpus by analyzing data points without the outlier.

In the non-transitory computer readable medium, the set of instructions that is executable by processor 402 may further cause outlier detection and removal device 400 to perform: applying spherical k-means clustering algorithm to the plurality of data points to identify k clusters of the plurality of data points. That is, the clusters of spherical k-means clustering may be determined using cosine similarity, as opposed to merely Euclidean distance from a centroid (as is used in classic k-means clustering). Using spherical k-means to cluster a text corpus would meet the unique challenge in detecting outliers in a digitized text corpus, that is, different words may be used to indicate the same semantic meaning (the sparsity problem). By using angular distance (cosine similarity) to cluster texts, it is better to capture the semantic meaning of the texts without considering the length of the texts. Further, the combination of the spherical k-means clustering and the sensitivity-based dynamic detection and removal of the outliers would allow the clustering converge fast, thereby accelerate the outlier detection and removal process.

Figure 5:
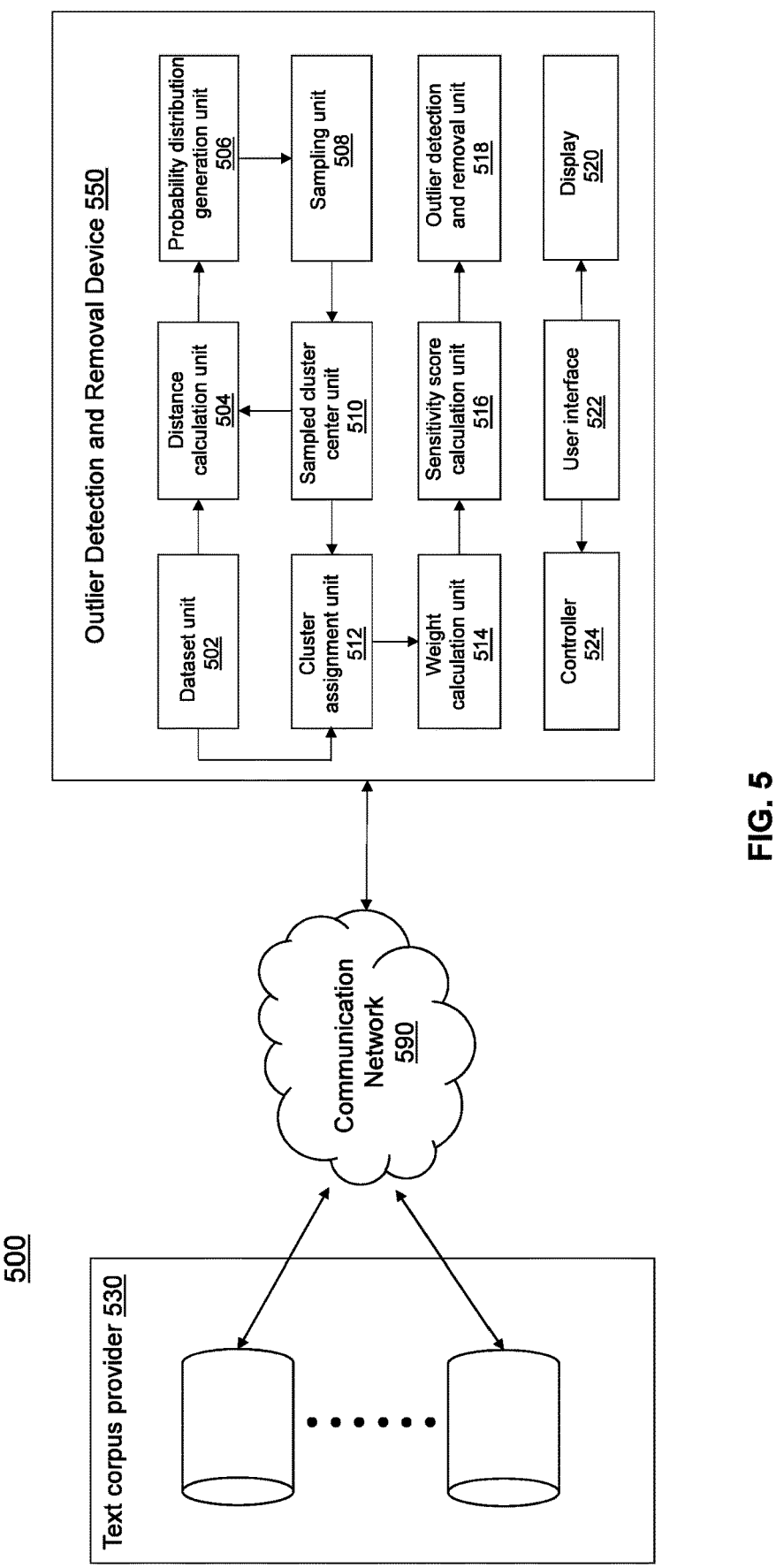
FIG. 5 is a schematic block diagram illustrating an exemplary system for detecting and removing outliers from a text corpus based on sensitivity score, consistent with some embodiments of the present disclosure.

Reference is now made to FIG. 5, a schematic block diagram illustrating an exemplary system for detecting and removing outliers from a text corpus based on sensitivity score, consistent with some embodiments of the present disclosure. As shown in FIG. 5, an outlier detection and removal system 500 may comprise an outlier detection and removal device 550 and a text corpus provider 530 that are in communication via communication network 590. Communication network 590 may be a wired network or a wireless network using remote signal such as an infrared signal, a radio signal, a WIFI signal, or any telecommunication signals. Text corpus provider 530 stores a text corpus database that is accessed by outlier detection and removal device 550 during outlier detection and removal process. Outlier detection and removal device 550 comprises all the structural units as shown in FIG. 3, and detailed descriptions about these units are omitted here for the sake of brevity.

Text corpus provider 530 may communicate with the communication network 590. Text corpus provider 530 may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 590 may include, without limitation, a direct interconnection, local area network (LAN), wide area network (WAN), wireless network (e.g., using Wireless Application Protocol), the Internet, etc. System 500 may employ other digital communication techniques although not explicitly recited.

In some embodiments of the present disclosure, a user may input a command to request a text corpus in user interface 522, controller 524 may transmit the command to text corpus provider 530, and the text corpus provider 530 may transmit the requested text corpus. The text corpus received from text corpus provider 530 may be saved in dataset unit 502. Controller 524 may send the text corpus to dataset unit 502 in a controlled manner (controlled amount, controlled time, or controlled transmission speed) to initiate outlier detection and removal process. The outlier detection and removal results may be transmitted to display 520, via wired or wireless communications, and a user may dynamically control the process based on the results displayed in display 520 if needed.

In some embodiments of the present disclosure, text corpus provider 530 may be one or more communication network devices (e.g., routers, gateways etc.) whose performance is critical in the communication network services. A service performance of the communication network device may be evaluated by collecting service key performance indicator (KPI) data. In particular, outliers detected from the KPI data may indicate failure of the service. However, conventional outlier detection in KPI data suffers from disadvantages such as low scalability and slow speed, etc. Outlier detection and removal system 500 as shown in FIG. 5 may provide solutions to the technical problems in the conventional art. For example, outlier detection and removal system 500 may be configured to obtain digitized KPI dataset from the one or more communication network devices, dynamically compute sensitivity scores of the data points of the KPI dataset, and dynamically determine outliers based on the dynamically computed sensitivity scores. The outlier detection and removal technique described in the present disclosure is simple, efficient and scalable, and requires only one pass over the dataset to detect and prune outliers, thereby provides technical solutions to the low scalability problem in conventional art. Also, dynamic removal of the outlier from the dataset allows the clustering process converges and thereby accelerates the clustering process and allows outlier detection and removal system 500 to provide fast response.

In some embodiments of the present disclosure, text corpus provider 530 may be one or more digitized health record providers, such as electronic medical records repositories of patient cases. Outliers of the health record data can provide valuable insights, such as medical errors and new variation of diseases, etc. However, the unique features of health care records, such as large scale and high-dimensionality (hundreds to thousands of dimensionalities, including patient, hospital, doctor, medicine information, etc.), bring challenges to conventional outlier detection techniques. Outlier detection and removal system 500 as shown in FIG. 5 may provide solutions to the technical problems in this field. For example, outlier detection and removal system 500 may be configured to obtain digitized health records dataset from the one or more health record providers, dynamically calculate sensitivity scores of the dataset, and detect outliers from the digitized health records based on dynamically computed sensitivity scores of the dataset. The spherical k-means clustering technique used in clustering of the data set allows efficient partitioning high-dimensional dataset and the detecting outliers based on dynamically determined sensitivity scores allows linear scan of the dataset and thereby meets the challenges in health care data analysis. The simple, efficient and scalable features of the proposed method provide technical solutions to the technical problems in digitized health care records analysis.

In some embodiments of the present disclosure, text corpus provider 530 may be one or more database for customer-targeted products, such as database for movies, books, clothes etc., and the outlier detection and removal system 500 may be a customer recommendation system. As most of the database that are used for building customer recommendation engines are noisy and contains outliers, removal of outliers before running recommendation engines algorithms is a crucial and essential step. Outlier detection and removal system 500 may obtain a digitized text corpus from the one or more database for customer-targeted products, partition and cluster similar users and then generate recommendations using purchases and ratings of the users in the clusters. By using cosine similarity in clustering and dynamically calculated sensitivity scores in filtering, outlier detection and removal system 500 may accurately and quickly detect and remove outliers from the text corpus and provide meaningful recommendations to customers at low cost.

Clustering documents is a fundamental subroutine in many machine learning and data mining applications. Thus, removal of outliers before performing the clustering is a very crucial step. The methods and apparatuses described in the present disclosure can be applied to, but not limited to, the technical areas such as detect service failure in telecommunication network; detecting medical errors or new diseases from health care records; automatically categorizing library records; summarizing search engines' results; spam filtering; credit card abuse detection in financial transactions; document summarization; learning feature representation; hypertext clustering and web searching and building recommendation engine for recommending products to users on e-commerce websites. As most of such datasets are noisy and contains outliers and presence of outliers may give results that are very different from optimal results. One can apply the outlier detection and removal mechanism described in the present disclosure to remove outliers to obtain optimal results. In some datasets, detected outliers can give valuable insights of the datasets and provide useful information.

For example, collaborative filtering algorithms are widely used among existing approaches to mender systems. Traditional approaches include assigning a user to the partition/cluster containing the most similar users and then using the purchases and ratings of users in this cluster to generate recommendations. Model-based techniques like clustering are very often used to represent users and items by means of a d-dimensional latent factor space. The similarity is measured by Cosine Similarity. Thus, spherical k-means clustering forms an important part of the collaborative filtering technique. Since there are outliers in the dataset, the mechanism proposed in this disclosure can help to identify outliers, and as a consequence will be able to detect the underlying clustering. The method of the present disclosure in conjunction with the collaborative filtering will lead to an efficient, accurate, and scalable technique for recommendation systems.

Disclosed embodiments implementing outlier detection of removal techniques discussed herein may provide advantageous effects such as:

By using angular distance (cosine similarity) in clustering of a text corpus, the semantic meaning of the texts may be captured better without affecting by the length of the texts, and thereby may provide solution to sparsity issue of text data.

By detecting outliers based on dynamically calculated sensitivity scores of the text corpus, accuracy of the outlier detection may be ensured.

By dynamic removal of the outliers from the text corpus, the clustering converges quickly and thereby data processing time may be reduced.

The outlier detection and removal techniques of the present disclosure may be very simple, efficient, and scalable, and may require only one pass over the dataset to detect and prune outliers. To quantify this, given a set of n documents the computational complexity certain embodiments may have a linear relationship with the number of entries to be processed (e.g., $O(n)$).

In certain embodiments, a user may be able to dynamically decide the number of outliers to be removed from a dataset based on dynamically calculated sensitivity scores of the data points, and thereby, the quality and accuracy of dataset may be better controlled.

Example embodiments are described above with reference to flowchart illustrations or block diagrams of methods, apparatuses, systems, and computer program products. Each block of the flowchart illustrations or block diagrams, and combinations of blocks in the flowchart illustrations or block diagrams, can be implemented by computer program instructions. These computer program instructions may be provided to a processor of a computer, or other programmable data processing apparatus to produce a machine, such that the instructions, which execute via the processor of the computer or other programmable data processing apparatus, create means for implementing the functions/acts specified in the flowchart or block diagram block or blocks.

These computer program instructions may also be stored in a computer readable medium that can direct a hardware processor core of a computer, other programmable data processing apparatus, or other devices to function in a particular manner, such that the instructions stored in the computer readable medium form an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart or block diagram block or blocks.

Any combination of one or more computer readable medium(s) may be utilized. The computer readable medium may be a non-transitory computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM, EEPROM or Flash memory), an optical fiber, a portable compact disc read-only memory (CD-ROM), an optical storage device, a magnetic storage device, cloud-based storage or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wireline, optical fiber cable, RF, IR, etc., or any suitable combination of the foregoing.

Computer program code for carrying out operations for example embodiments may be written in any combination of one or more programming languages, including an object-oriented programming language such as Java, Smalltalk, C++, Python, Matlab or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The flowchart and block diagrams in the Figures illustrate examples of the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts, or combinations of special purpose hardware and computer instructions.

It is understood that the described embodiments are not mutually exclusive, and elements, components, materials, or steps described in connection with one example embodiment may be combined with, or eliminated from, other embodiments in suitable ways to accomplish desired design objectives.

Reference herein to "some embodiments" or "some exemplary embodiments" mean that a particular feature, structure, or characteristic described in connection with the embodiment can be included in at least one embodiment. The appearance of the phrases "one embodiment" "some embodiments" or "some exemplary embodiments" in various places in the specification do not all necessarily refer to the same embodiment, nor are separate or alternative embodiments necessarily mutually exclusive of other embodiments.

It should be understood that the steps of the example methods set forth herein are not necessarily required to be performed in the order described, and the order of the steps of such methods should be understood to be merely example. Likewise, additional steps may be included in such methods, and certain steps may be omitted or combined, in methods consistent with various embodiments.

As used in this application, the word "exemplary" is used herein to mean serving as an example, instance, or illustration. Any aspect or design described herein as "exemplary" is not necessarily to be construed as preferred or advantageous over other aspects or designs. Rather, use of the word is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Unless explicitly stated otherwise, each numerical value and range should be interpreted as being approximate as if the word "about" or "approximately" preceded the value of the value or range.

The use of figure numbers or figure reference labels in the claims is intended to identify one or more possible embodiments of the claimed subject matter to facilitate the interpretation of the claims. Such use is not to be construed as necessarily limiting the scope of those claims to the embodiments shown in the corresponding figures.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

It will be further understood that various changes in the details, materials, and arrangements of the parts which have been described and illustrated in order to explain the nature of described embodiments may be made by those skilled in the art without departing from the scope as expressed in the following claims.

What is claimed is:

1. An apparatus for detecting outliers of a digitized text corpus, the apparatus comprising:
a memory for storing instructions; and
a processor that, when executing the instructions performs a method, the method comprising:
receiving the digitized text corpus comprising a plurality of data points ($X=\{x_i\}_{i=1}^{n}$);
identifying k clusters of the plurality of data points, wherein k is a natural number smaller than n;
sampling a data point among the plurality of data points as a first cluster center of the k clusters;
determining sampling probability of each of remaining data points of the plurality of data points, wherein the remaining data points indicate a difference between the plurality of data points and the sampled data point and the sampling probability indicates a probability of each of the remaining data points to be sampled as a next cluster center of the k clusters;
sampling the next cluster center based on the sampling probability and iterate the process of determining sampling probability and the process of sampling the next cluster center until k cluster centers are sampled to form a set of cluster centers $C=\{C\}_{i=1}^{k}$, wherein each of the k cluster centers corresponds to each of the k clusters;

generating weightage for each of the k cluster centers by counting a number of data points belonging to each of the k cluster centers;

determining sensitivity scores of the data points belonging to each of the k cluster centers based on the weightage for each of the k cluster centers;

labeling, based on the determined sensitivity scores, a data point having a sensitivity score greater than a threshold value as an outlier of the digitized text corpus and removing the outlier from the digitized text corpus; and providing a first parameter of the digitized text corpus by analyzing the removed outlier or a second parameter of the digitized text corpus by analyzing data points without the outlier.

2. The apparatus of claim 1, wherein the k clusters of the plurality of data points are identified by spherical k-means clustering algorithm applied to the plurality of data points.

3. The apparatus of claim 1, wherein the first cluster center is selected among data points belonging to a cluster having a highest density of data points among the k clusters.

4. The apparatus of claim 1, wherein the sampling probability is determined by calculating angular distance between the sampled data point and each of the remaining data points and normalizing the calculated angular distance with a sum of all distances between the sampled data point and the remaining data points.

5. The apparatus of claim 1, wherein a sensitivity of a data point is determined based on determination of a maximal ratio between a cost contribution of the data point and an average cost contribution of the plurality of data points.

6. The apparatus of claim 1, wherein the number of data points belonging to each of the k cluster centers is determined by assigning each of the plurality of data points to a nearest cluster center among the k cluster centers and determining distance between each of the plurality of data points and the corresponding nearest cluster center.

7. The apparatus of claim 1, wherein the threshold value is determined based on a number of outliers that a user decided to detect and remove from the digitized text corpus.

8. A method for detecting outliers of a digitized text corpus, the method comprising:

receiving the digitized text corpus comprising a plurality of data points $(X=\{x_i\}_{i=1}^{n})$;

identifying k clusters of the plurality of data points, wherein k is a natural number smaller than n;

sampling a data point among the plurality of data points as a first cluster center of the k clusters;

determining sampling probability of each of remaining data points of the plurality of data points, wherein the remaining data points indicate a difference between the plurality of data points and the sampled data point and the sampling probability indicates a probability of each of the remaining data points to be sampled as a next cluster center of the k clusters;

sampling the next cluster center based on the sampling probability and iterate the process of determining sampling probability and the process of sampling the next cluster center until k cluster centers are sampled to form a set of cluster centers $C=\{C\}_{i=1}^{k}$, wherein each of the k cluster centers corresponds to each of the k clusters;

generating weightage for each of the k cluster centers by counting a number of data points belonging to each of the k cluster centers;

determining sensitivity scores of the data points belonging to each of the k cluster centers based on the weightage for each of the k cluster centers;

labeling, based on the determined sensitivity scores, a data point having a sensitivity score greater than a threshold value as an outlier of the digitized text corpus and removing the outlier from the digitized text corpus; and providing a first parameter of the digitized text corpus by analyzing the removed outlier, or a second parameter of the digitized text corpus by analyzing data points without the outlier.

9. The method of claim 8, wherein the identifying k clusters of the plurality of data points further comprises:

applying, by the processor, spherical k-means clustering algorithm to the plurality of data points.

10. The method of claim 8, wherein the first cluster center is selected among data points belonging to a cluster having a highest density of data points among the k clusters.

11. The method of claim 8, wherein the determining sampling probability of each of remaining data points of the plurality of data points further comprises:

calculating, by the processor, angular distance between the sampled data point and each of the remaining data points; and normalizing, by the processor, the calculated angular distance with a sum of all distances between the sampled data point and the remaining data points.

12. The method of claim 8, wherein a sensitivity of a data point is determined based on determination of a maximal ratio between a cost contribution of the data point and an average cost contribution of the plurality of data points.

13. The method of claim 8, wherein the generating weightage of each of the k cluster centers further comprises:

assigning, by the processor, each of the plurality of data points to a nearest cluster center among the k cluster centers; and determining, by the processor, distance between each of the plurality of data points and the corresponding nearest cluster center.

14. The method of claim 8, wherein the threshold value is determined based on a number of outliers that a user decided to detect and remove from the digitized text corpus.

15. A non-transitory computer readable medium including instructions stored thereon that when processed by a processor cause a system for detecting outliers of a digitized text corpus to perform acts of:

receiving the digitized text corpus comprising a plurality of data points $(X=\{x_i\}_{i=1}^{n})$;

identifying k clusters of the plurality of data points, wherein k is a natural number smaller than n;

sampling a data point among the plurality of data points as a first cluster center of the k clusters;

determining sampling probability of each of remaining data points of the plurality of data points, wherein the remaining data points indicate a difference between the plurality of data points and the sampled data point and the sampling probability indicates a probability of each of the remaining data points to be sampled as a next cluster center of the k clusters;

sampling the next cluster center based on the sampling probability and iterate the process of determining sampling probability and the process of sampling the next cluster center until k cluster centers are sampled to form a set of cluster centers $C=\{C\}_{i=1}^{k}$, wherein each of the k cluster centers corresponds to each of the k clusters;

generating weightage for each of the k cluster centers by counting a number of data points belonging to each of the k cluster centers;

determining sensitivity scores of the data points belonging to each of the k cluster centers based on the weightage for each of the k cluster centers;

labeling, based on the determined sensitivity scores, a data point having a sensitivity score greater than a threshold value as an outlier of the digitized text corpus and removing the outlier from the digitized text corpus; and providing a first parameter of the digitized text corpus by analyzing the removed outlier or a second parameter of the digitized text corpus by analyzing data points without the outlier.

16. The medium of claim 15, wherein the identifying k clusters of the plurality of data points further comprises:

applying spherical k-means clustering algorithm to the plurality of data points.

17. The medium of claim 15, wherein the first cluster center is selected among data points belonging to a cluster having a highest density of data points among the k clusters.

18. The medium of claim 15, wherein the determining sampling probability of each of remaining data points of the plurality of data points further comprises:

calculating angular distance between the first cluster center and each of the remaining data points; and normalizing the calculated angular distance with a sum of all distances between the first cluster center and the remaining data points of the plurality of data points.

19. The medium of claim 15, wherein a sensitivity of a data point is determined based on determination of a maximal ratio between a cost contribution of the data point and an average cost contribution of the plurality of data points.

20. The medium of claim 15, wherein the threshold value is determined based on a number of outliers that a user decided to detect and remove from the data set.

21. The medium of claim 15, wherein the generating weightage of each of the k cluster centers further comprises:

assigning each of the plurality of data points to a nearest cluster center among the k cluster centers; and determining distance between each of the plurality of data points and the corresponding nearest cluster center.

* * * * *